United States Patent

Gicesku

[11] Patent Number: 6,012,368
[45] Date of Patent: Jan. 11, 2000

[54] BURLEY DEVICE

[76] Inventor: Peter Gicesku, 10/5 Davison Street, Queanbeyan NSW 2620, Australia

[21] Appl. No.: 08/927,526

[22] Filed: Sep. 11, 1997

[30] Foreign Application Priority Data

Sep. 11, 1996 [AU] Australia ................................. P02242
Mar. 27, 1997 [AU] Australia ................................. P05913

[51] Int. Cl.⁷ .................................................. A01K 97/02
[52] U.S. Cl. .............................. 83/147; 83/167; 83/468.6
[58] Field of Search .............................. 83/441, 469, 471, 83/471.2, 417, 596, 355, 491, 675, 676, 167, 468.6, 207, 350, 356, 106, 147, 149, 150; 241/101.4; 43/4.5, 44.99; 452/31, 35, 45

[56] References Cited

U.S. PATENT DOCUMENTS

| | | | |
|---|---|---|---|
| 19,238 | 2/1858 | Chapman | 83/147 |
| 80,531 | 8/1868 | Bennet et al. | 83/675 |
| 2,023,323 | 12/1935 | Herrick | 83/106 |
| 2,262,882 | 11/1941 | Bucklin | 83/417 |
| 2,590,909 | 4/1952 | Westby et al. | 83/150 |
| 3,299,925 | 1/1967 | McBrady et al. | 83/675 |
| 3,493,023 | 2/1970 | Holz | 83/491 |
| 3,601,845 | 8/1971 | Mavrich | 452/43 |
| 4,043,238 | 8/1977 | Van Ham | 83/676 |
| 4,488,464 | 12/1984 | Rooke et al. | 83/355 |
| 5,129,316 | 7/1992 | Calderon | 452/35 |
| 5,291,815 | 3/1994 | Reifenhauser | 83/596 |
| 5,392,758 | 2/1995 | Rognon | 83/676 |
| 5,499,578 | 3/1996 | Payne | 83/932 |
| 5,662,033 | 9/1997 | Yawman | 83/932 |

FOREIGN PATENT DOCUMENTS

581537 3/1987 Australia .

*Primary Examiner*—Rinaldi I. Rada
*Assistant Examiner*—Gyounghyun Bae

[57] ABSTRACT

A burley device (10) including a container having an agitator (24) for dispensing burley through a variable size aperture (34) and a cubing mechanism for cubing pilchards or the like. The cubing mechanism includes a gate plate (26) and cutting plate (28) which align with and extend through slots (46) in a guide conduit (48). The gate plate and cutting plate rotate with an electrically driven shaft.

7 Claims, 4 Drawing Sheets

BURLEY DEVICE

TECHNICAL FIELD

This invention relates to a burley device. In a preferred embodiment the device is capable of cubing elongate articles such as pilchards or other bait fish.

As used herein the term "cubing" is used in reference to the cutting of an elongate article into shorter lengths.

It should also be noted that in some locations burley is known as "chum".

BACKGROUND ART

It is well known to use burley to attract fish. Traditionally, fishermen have periodically thrown burley overboard using a bucket or the like. Burley may include fish pieces, blood, fish oil, stock feed pellets etc.

An automatic burley device is disclosed in Australian Patent 581537 to Bodanski. This document discloses a burley container adapted to be mounted below the waterline and including mixing means for mixing the burley with water and dispensing means for dispensing the wet mix in a controlled manner.

DISCLOSURE OF INVENTION

This invention in one aspect resides in a burley device for cubing an elongate article, the burley device including:

a conduit for guiding the elongates article;

a gate for normally closing the conduit and blocking passage of the elongate article;

a cutter disposed upstream of the gate for cutting a length from the elongate article, the cutter closing the conduit during cutting;

wherein the gate opens whilst the conduit is closed by the cutter to allow passage of the cut length of the elongate article.

Preferably, the gate and cutter means are disc-like members which are parallel and spaced on a rotating shaft. The gate and cutter have non-concentric peripheries such that rotation of the shaft causes the gate and cutter to open and close the conduit respectively. Preferably, the gate and cutter extend through slots extending transversely of the conduit.

Preferably, the spacing between the cutter and gate can be varied soas to vary the dimension of the cut length.

In another aspect the invention resides in a burley device including:

container including dispensing at the lower end thereof, the dispensing being disposed above the waterline in use so that the burley is kept dry;

agitating for agitating the burley and causing the burley to exit the container through the dispensing.

Preferably, the dispensing is a variable size aperture or opening in the container.

BRIEF DESCRIPTION OF DRAWINGS

In order that this invention may be more easily understood and put into practical effect, reference will now be made to the accompanying drawings which illustrate preferred embodiments of the invention, wherein.

BEST MODE

Figure 1:
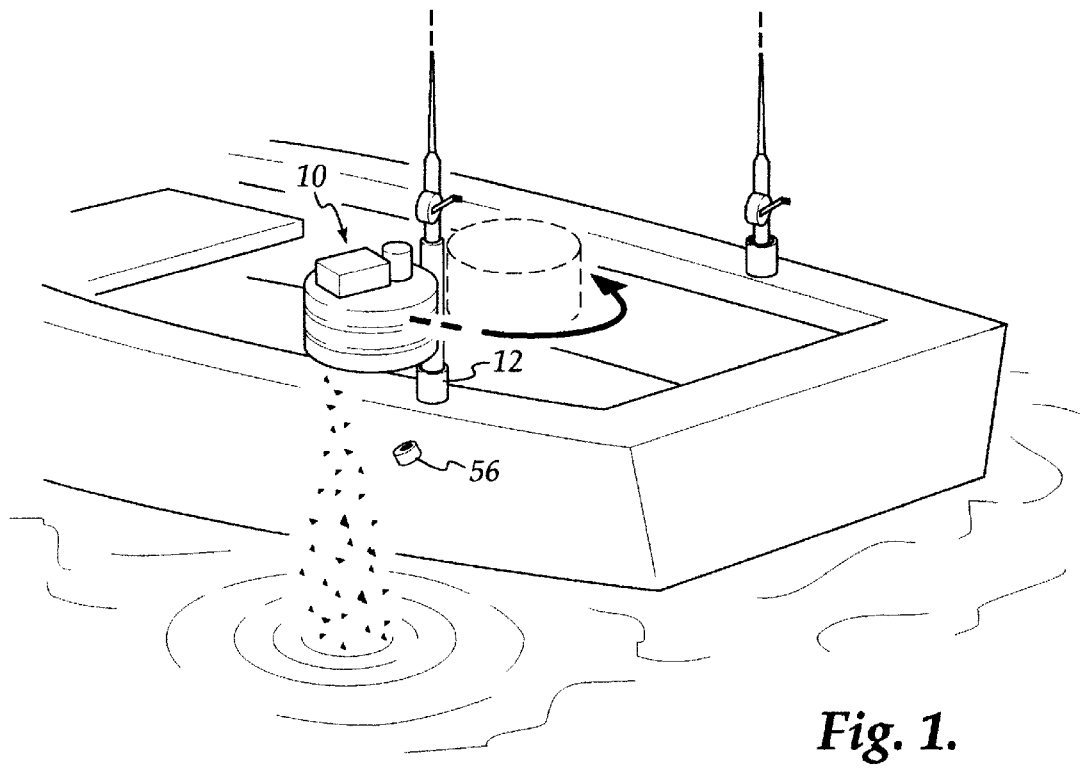
FIG. 1 is a schematic perspective view showing the burley device in operative and stowed positions.
Figure 2:
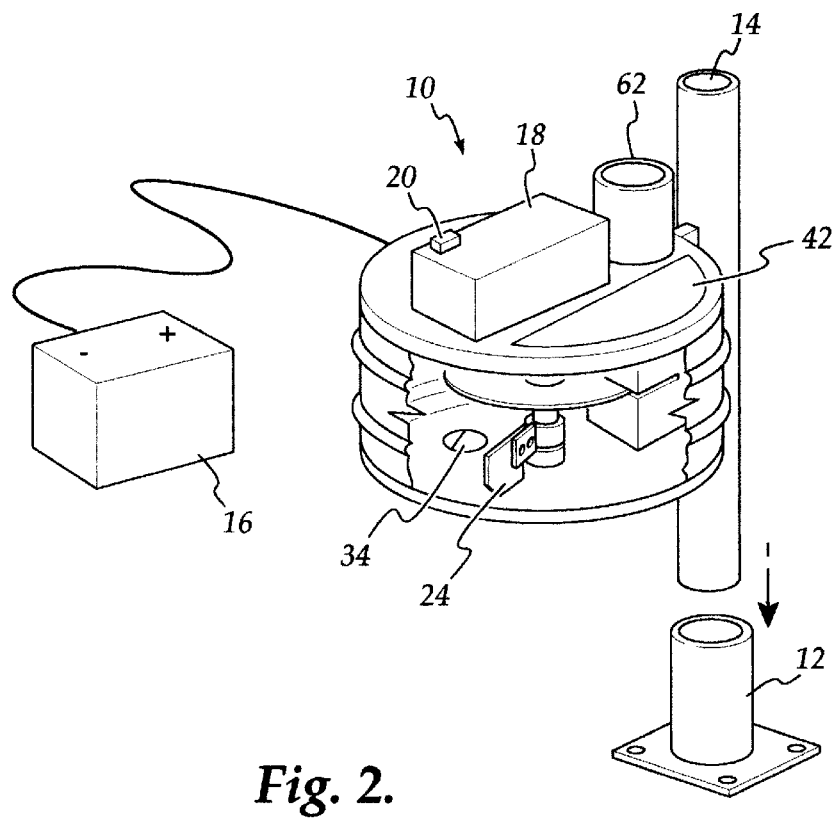
FIG. 2 is an enlarged schematic perspective view showing hidden detail.

With reference to FIGS. 1 & 2, the barley device 10 is adapted to be removably mounted in a conventional rod holding socket 12 and may be rotated between an inboard stowed position (ghosted) and an outboard operative position. The burley device defines a rod holding socket 14 at its upper end which may receive a fishing rod.

With reference to FIG. 2, the burley device is powered by a battery 16 which is electrically connected to a housed electric motor 18 via a switch 20.

Figure 3:
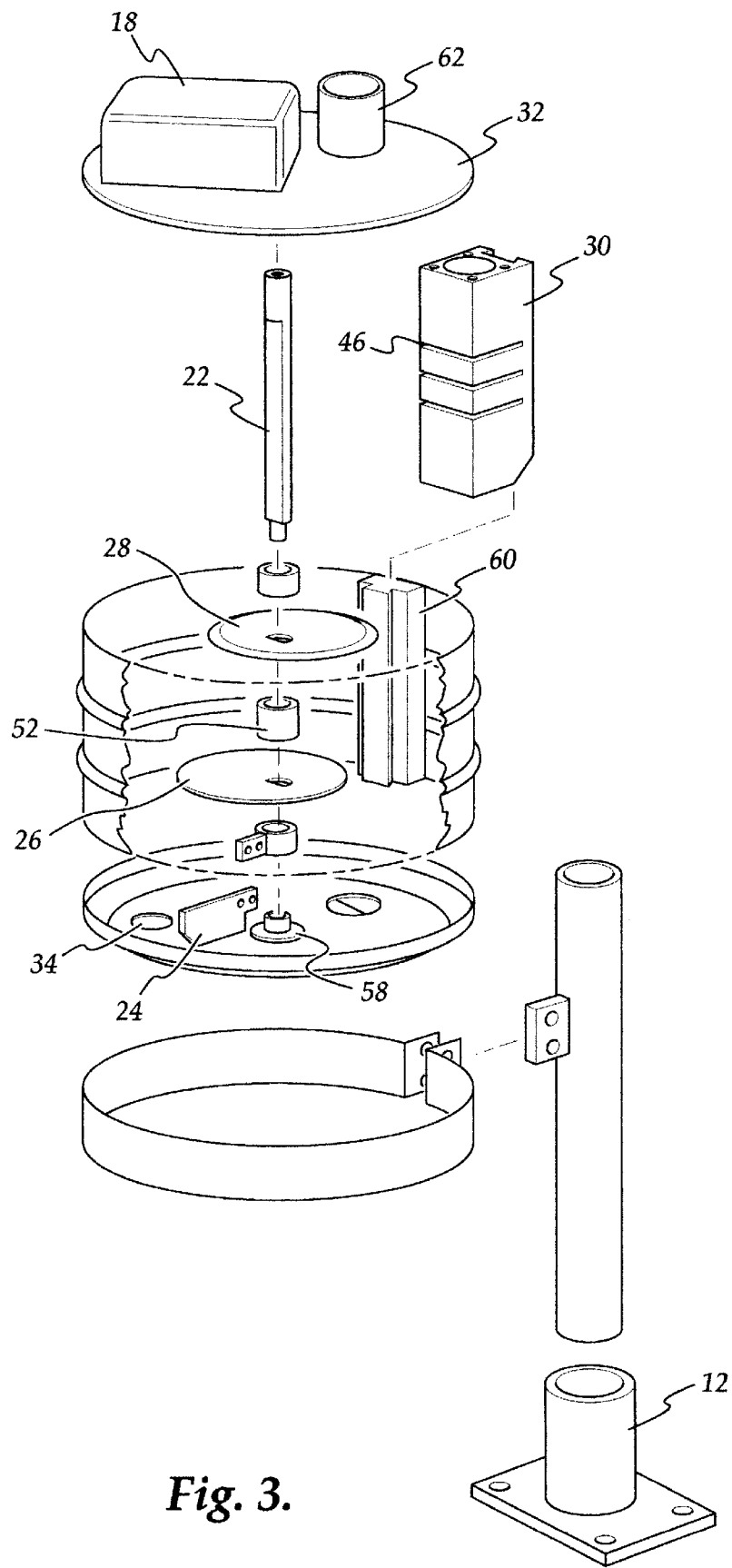
FIG. 3 is an exploded view of FIG. 2.

With reference to FIG. 3, the electric motor is operative to drive a shaft 22 on which is spline mounted an agitator 24, a gate plate 26 and a cutting plate 28. The electric motor 18, shaft 22 and block 30 are all mounted to the lid 32 of the container.

The agitator is operative to cause burley such as pellets to be dispensed through a variable size aperture 34 provided in the floor of the container. The floor of the container may be tapered to facilitate flow of the pellets to the aperture. The agitator may be operative to both crush and dispense the burley.

Figure 4:
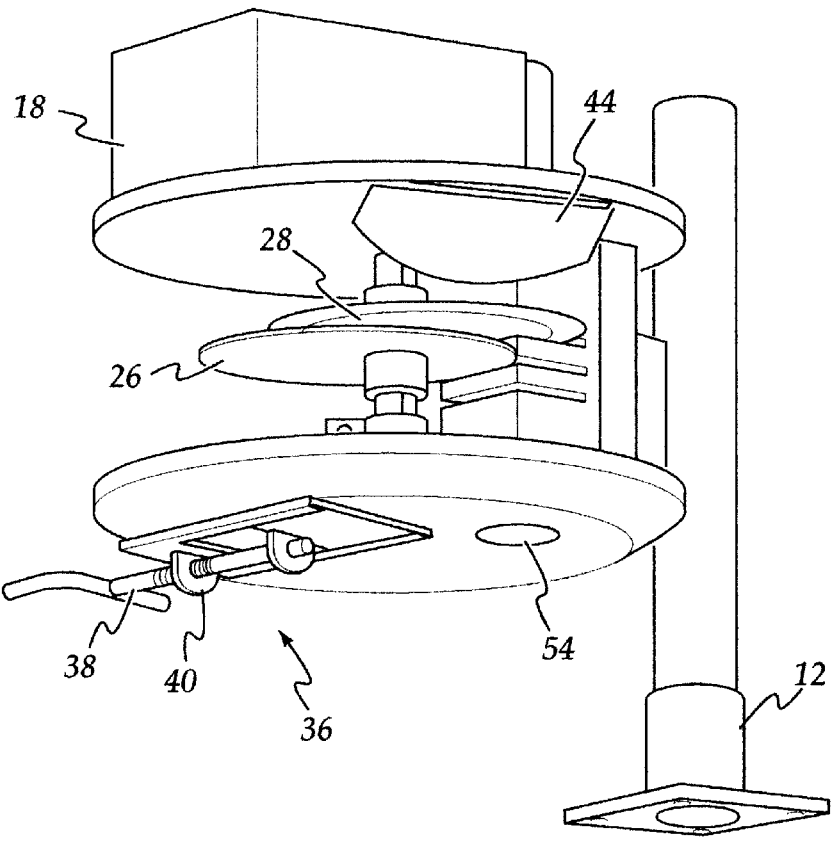
FIG. 4 is an underside perspective view with the wall of the container removed.

As best seen in FIG. 4, the size of the aperture 34 may be varied by a gate valve 36 which can be manually varied via a threaded shaft 38 and captive nut arrangement 40.

Referring to FIG. 2 again, pellets or the like may be introduced into the container via a hinged access 42. Furthermore, as seen in FIGS. 4 and 5, access by fingers to the interior of the container is prevented by a shield 44 which is disposed below the access 42.

Figure 5:
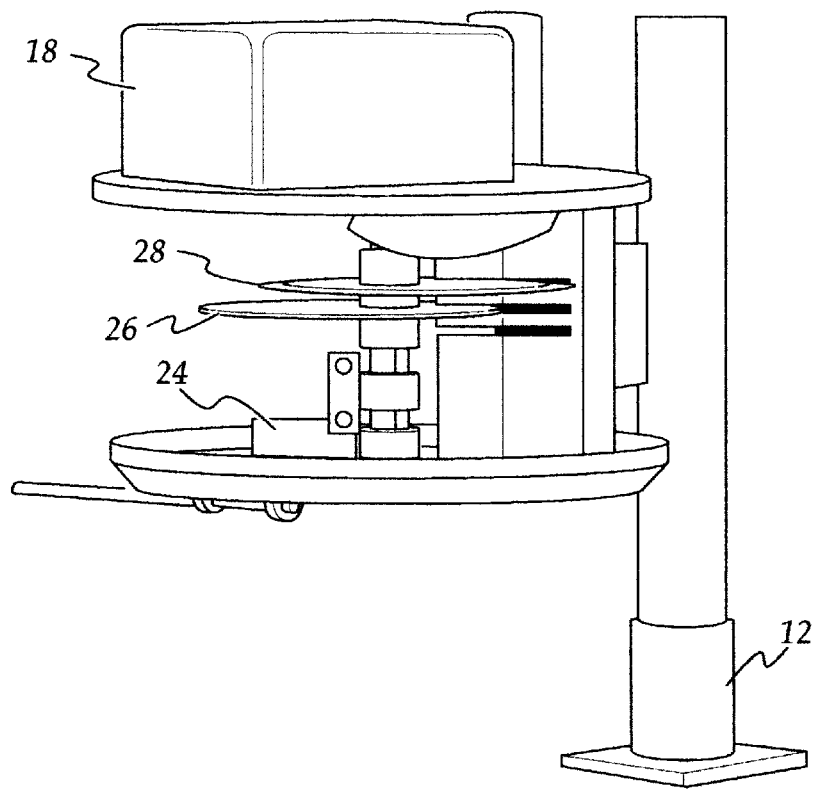
FIG. 5 is an elevation view with the wall of the container removed.
Figure 6A:
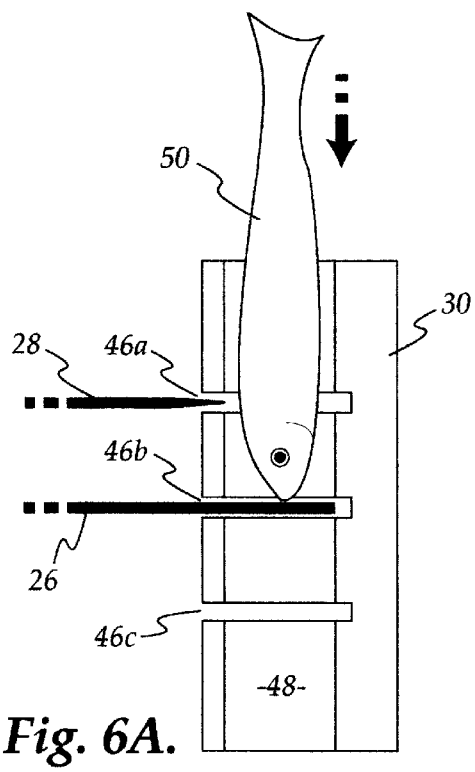
FIGS. 6A and 6C are a series of sequential views showing a pilchard or the like being cubed.
Figure 6B:
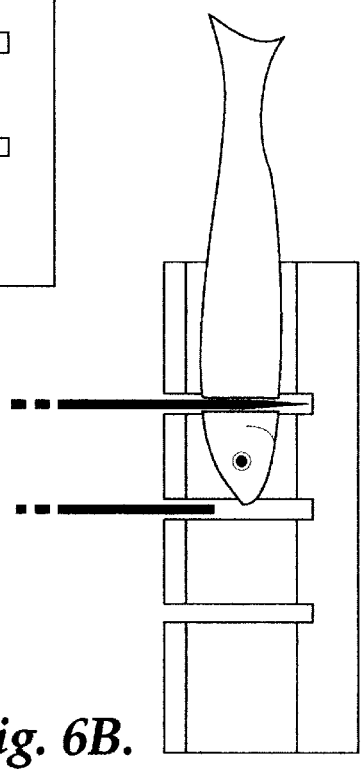
Figure 6C:
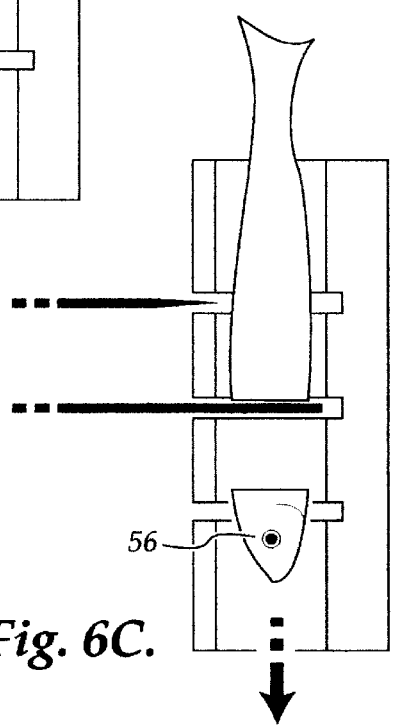

As best shown in FIGS. 4, 5 and 6, the gate plate 26 and cutting plate 28 align with slots 46a, 46b, 46c in block 30. Block 30 defines a conduit 48 through which an elongate article such as a pilchard 50 or the like may pass. The block includes horizontal slots 46a, 46b, 46c through which the gate plate and cutting plate may extend. The third slot is provided so that the dimension of the cut cube can be varied between small (as shown) and large (in which the gate plate aligns with slot 46c). The spacing of the gate plate and cutting plate is dictated by the axial dimension of a spacer 52 provided on the shaft between the gate plate and cutting plate.

As can be best seen in FIG. 6, the pilchard slides down the conduit until its further passage is blocked by the gate plate. Both the gate plate and cutting plate have non-concentric or "cam-like" peripheries which means that rotation of the shaft causes the the gate plate to periodically open the conduit and the cutting plate to periodically close the conduit with a resultant cutting action. As can be seen from FIG. 6A, the gate plate normally closes the conduit and prevents passage of the pilchard. Rotation of the shaft causes the cutting plate to sever a cube from the pilchard and also causes the gate plate to open hence allowing the severed cube 56 to drop through the conduit and out a second aperture 54 provided in the floor of the container. Obviously, this operation is cyclically repeated.

As mentioned previously, the shaft and block are mounted to the lid of the container. Means are provided within the interior of the container for guiding the lid during closure of the container by the lid. Specifically, a female member 58 is provided on the floor of the container for receiving and locating the lowermost extent of the shaft. Also, a male keyed member 60 is provided on the wall of the container for mating with a corresponding female key provided on the block 30.

The preferred embodiment of the present invention provides a burley device which can continuously dispense burley from within the container at a rate determined by the variable size aperture 34. Furthermore, cubes 56 of pilchard or the like can be periodically dispensed by dropping the pilchard into the conduit for cubing. A guide 62 is provided for directing the pilchard into the conduit.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

I claim:

1. A burley device for cubing an article, the burley device comprising:

a conduit for receiving and guiding the article;

a gate constructed and arranged to selectively close off said conduit and block passage of the article therethrough;

a cutter disposed upstream of said gate relative to a direction of passage of the article through said conduit and constructed and arranged to cut a length from the article, said cutter being arranged to selectively close off said conduit during cutting;

a burley container including a dispensing mechanism at a lower end thereof, said dispensing mechanism being constructed and arranged so that burley in said burley container is kept dry; and an agitating mechanism constructed and arranged to agitate the burley in said burley container and causing the burley to exit said burley container through said dispensing mechanism:

wherein said gate is arranged relative to said cutter such that said gate leaves said conduit open whilst said conduit is closed off by said cutter, thereby allowing passage of the cut length of the article out of said conduit.

2. The burley device as claimed in claim 1, wherein said gate and cutter are each flattened members mounted in parallel and axially spaced apart from each other on a rotatable shaft.

3. The burley device as claimed in claim 2, wherein said gate and cutter are mounted on said rotatable shaft so as to be angularly offset from each other about an axis of said rotatable shaft, whereby said gate leaves said conduit open when said cutter closes off said conduit and said gate closes off said conduit when said cutter leaves said conduit open.

4. The burley device as claimed in claim 2, wherein said conduit includes slots formed therethrough and arranged such that said gate and cutter pass through respective said slots.

5. The burley device as claimed in claim 4, wherein said conduit includes at least three slots formed therethrough, wherein said axial spacing between said gate and cutter is variable in correspondence with said at least three slots.

6. The burley device as claimed in claim 1, wherein said dispensing mechanism is a variable size aperture formed in said burley container.

7. The burley device as claimed in claim 1, wherein said conduit includes slots formed therethrough and arranged such that said gate and cutter pass through respective said slots.

* * * * *